Patented Dec. 8, 1942

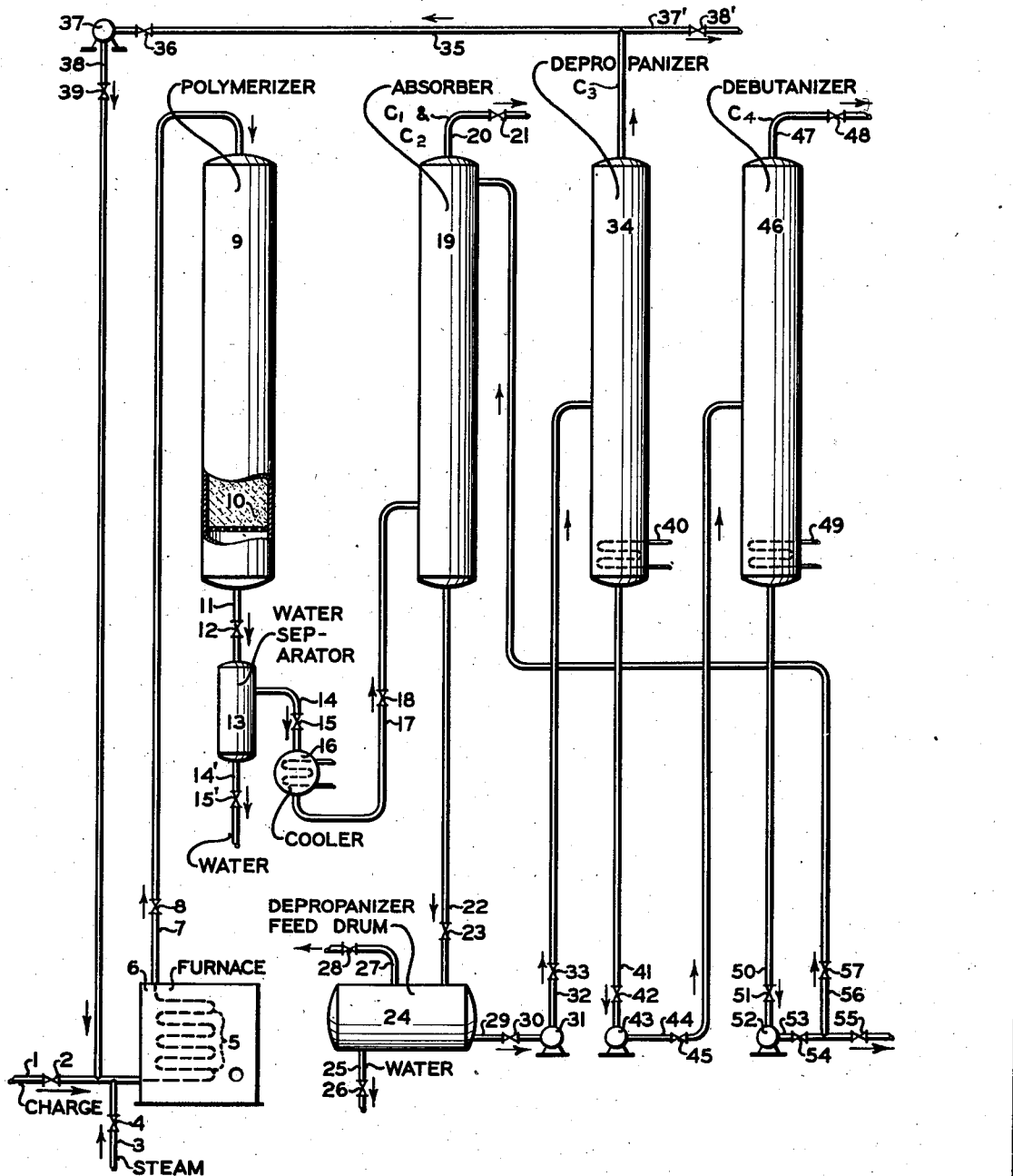

2,304,654

UNITED STATES PATENT OFFICE 2,304,654

CONVERSION OF HYDROCARBONS

Robert Pyzel and Elmer R. Kanhofer, Chicago, Ill., assignors to Universal Oil Products Company, Chicago, Ill., a corporation of Delaware Application October 19, 1939, Serial No. 300,174

8 Claims. (Cl. 196—10)

This application is a continuation-in-part of our co-pending application Serial No. 160,248, filed August 21, 1937.

This invention relates more particularly to the conversion of normally gaseous mono-olefinic hydrocarbons into liquid polymers boiling within the range of commercial motor fuels which can be blended therewith for the improvement of their antiknock value.

More specifically the invention is concerned with a type of process involving the cooperative action of inter-connected steps whereby the olefinic hydrocarbons present in the gases produced incidental to commercial cracking operations on the heavier distillates and residue from petroleum for the primary object of producing gasoline may be profitably treated to convert their olefinic content into valuable high antiknock liquid polymers which augment the overall yield from the cracking processes.

The cracking of hydrocarbon oils as ordinarily practiced involves primary reactions of dehydrogenation and rupturing of carbon-to-carbon bonds and secondary reactions involving recombination of primary radicals and olefins and cyclization. Thus the unsaturation of all cracked products is generally higher than the corresponding fractions produced in straight run distillations of petroleums.

This unsaturation, insofar as it is due to liquid mono-olefinic, naphthenic, or cyclic hydrocarbons is of benefit in that these compounds have higher antiknock value than the saturated compounds of an equivalent number of carbon atoms. However, the cracked gases constitute an important loss which may run as high as 10–15% by weight of the charge in intensive cracking operations and it is an object of the present invention to provide a process which shall enable the efficient and practical treatment of cracked gas mixtures to produce liquid polymers from the olefins which they contain. As will be seen from the succeeding detailed description, this object is accomplished by a succession of closely cooperating steps involving generally the preliminary purification of the gas mixtures when necessary, the use of specific catalysts and conditions of operation to effect polymerization, the effective fractionation of the products from the polymerizing stage, the production of a refined main product and valuable by-products, and a method for the effective regeneration of the catalytic material employed.

In one specific embodiment the present invention comprises the preliminary treatment of olefin-containing gas mixtures containing substantial percentages of propene and the butenes with basic materials including solutions of hydroxides of the alkali metals, amines, such as triethanolamine, suspensions of alkaline earth oxides such as milk of lime, etc., for the reduction of their sulfur content, the subjection of the treated gases to contact with solid phosphoric acid catalysts to polymerize the olefins, the absorption of residual gaseous products by stabilized process liquids to conserve 3- and 4-carbon atom hydrocarbons, stabilization of the liquid products to eliminate part or substantially all hydrocarbons having less than 4 carbon atoms to the molecule with return of stabilizer overhead in regulated quantities to the polymerizing step, the recovery of dissolved butane as a by-product, the sweetening of the debutanized polymers and the fractionation thereof to produce an overhead product of desired characteristics.

It is to be understood that the process of the present invention carried out in different types of plants so that it is not specially limited to any particular plant hookup. Charging stocks comprising essentially three and four carbon atom mixtures from the stabilizers of cracking plants may be preliminarily treated with the basic materials mentioned either in gaseous, liquid, or mixed phase and then passed to contact with the preferred solid phosphoric acid catalysts in a series of reactors after being brought to suitable temperatures and pressures. If the charging stocks are sufficiently low in sulfur compounds and other impurities the original treating step may be omitted and the charge passed directly to a series of polymerizing chambers. Preliminary treatments for the removal of sulfur are usually conducted on charging stocks containing sulfur compounds corresponding to approximately 500 grains of sulfur per 100 cu. ft. of gaseous charge, the sulfur usually being present in the form of hydrogen sulfide and low boiling mercaptans. Any type of contacting apparatus may be employed to effect the desulfurizing treatment.

Since the water in the catalytically reactive phosphoric acid of the granular catalyst particles normally exerts a definite vapor pressure under the preferred conditions of treatment to be presently specified, it is necessary to add controlled amounts of water or steam to the preheated gaseous charging material before contacting with the polymerizing catalyst. As a rule, 2–5% of water vapor should be present in the gaseous mixtures undergoing contact with the solid phosphoric acid catalysts. If this is not done, the active acid catalytic material undergoes gradual dehydration with the formation of materials which are substantially inactive catalytically so that the effectiveness of the catalyst is reduced to an undesirable extent.

The temperature to which the charging stocks are heated will depend upon a number of factors, among which may be mentioned the percentage of higher olefins present including propene and the butenes, the relative proportions of the several olefins, the effectiveness of the catalyst employed and in general the type of polymers desired. However, when treating charges consisting of cracked gas mixtures containing from 8–25% of the so-called "higher olefins" including propene and the butenes, the most common range of temperatures is from 300–550° F. under pressures of from approximately 100–350 lbs. per square inch. In the case of stabilizer overhead fractions which may contain 25–40% of higher olefins and substantially no hydrocarbons of less than 3 carbon atoms to the molecule, the preferred temperatures are between about 300 and 500° F. and the pressures from about 100 to 350 lbs. per square inch. The preheated and controllably humidified charge now contacts granular catalyst beds in a number of chambers which may be operated in parallel or in series by manipulation of proper valves. As a rule the charge passes into a main header which may be connected to any one of a series of towers which may be operated either in series or in parallel. It has been found that contamination of the polymerizing catalyst does not begin until the primary reactions of polymerization have proceeded to a point where a small part of the simple polymers begins to undergo an extensive polymerization, forming small but definite amounts of tarry and readily carbonizable material. Ordinarily this phenomenon is of such a character that the last tower in a series becomes ineffective sooner than the first tower and thus the last tower is bypassed to permit its reactivation before cutting back into the series. The following tabulation shows the normal cycle of a four-tower series flow with three always on the line and one undergoing reactivation. The tower undergoing reactivation is always the one which has just been the last of the series and which will be placed as the first of the series when reactivation has been completed.

|  | Towers in service | Tower being reactivated (or catalyst replaced) |
|---|---|---|
| First order | 2–3–4 |  |
| Second order | 1–2–3 | 4 |
| Third order | 4–1–2 | 3 |
| Fourth order | 3–4–1 | 2 |
| Fifth order, etc | 2–3–4 | 1 |

The above constitutes a preferred cycle of flows through a set of reactors. Other sequences or parallel flow may be used if found advantageous in specific cases.

The catalyst which is preferably employed in the present process has already been mentioned as a "solid phosphoric acid" catalyst. A catalyst of this character is prepared by the general operations of mixing a phosphoric acid with a relatively inert adsorbent material preferably of a siliceous character, which as kieselguhr, until a paste consisting of a major proportion by weight of the acid is produced, heating the pasty mixture to temperatures within the approximate range of 550–750° F. to produce a solid cake, grinding and sizing the cake with precautions for avoiding moist air contacts to produce particles of approximately uniform mesh and hydrating the particles by contact with superheated steam at temperatures of approximately 510° F. at atmospheric pressure to produce a degree of hydration of the phosphoric acid corresponding to maximum catalytic activity. This procedure may be alternated by employing extrusion or forming methods of the original pasty mixtures to produce small particles of regulated size and shape prior to the heating or calcining step. Though the catalyst composites are difficult to analyze, there are indications that one of the active constituents of catalysts thus prepared corresponds to a phosphoric acid of a slightly greater degree of dehydration than pyrophosphoric acid. There are also some silicophosphoric acid complexes of varying composition present in the composites, which may contribute to the desired catalytic and structural properties of the particles.

In the preferred operation of the process, the preheated hydrocarbon charge in vapor phase is passed downwardly through the towers in series. The catalyst contained in each of the polymerizing towers may be sectionalized so that there is a limit to the thickness of the bed on any one support. This is done to prevent the development of too great a pressure on the particles at the bottom of each bed which might result in a crushing effect with the development of fines which tend to fill the interstices between the granular particles and obstruct the free flow of gases or vapors. The maximum allowable thickness of any column or section of catalyst bed will vary with the size, shape, and structural strength of the particles. Those of irregular shape made by crushing and sizing the primary calcined cake can seldom be used in practice in depths of over 15 ft. while those of regular size and shape made by extrusion or pelleting methods will stand higher pressures without crushing and may be used in depths of approximately 30 feet.

The reaction of polymerization is exothermic and as fresh olefin-containing vapor mixtures flow in series through the towers, there will be a temperature rise which is customarily offset by introducing the preheated mixture at a low reaction temperature, the temperature being allowed to rise as a result of the heat generated by the reaction. When, due to lowered activity of the catalyst, the degree of polymerization drops below a practical value, tower 1 is then cut into the series flow and tower 4 is cut out of the flow and is reactivated, and so on as above indicated. This progression in the use of the towers along the line of flow will obviously result ultimately in the last tower being the first of the series.

The catalyst towers are preferably provided with jackets which may serve the functions of acting as protectors or insulators from the outside atmospheric influences or heaters during different steps in the reactivation of the catalysts. Heating or cooling fluids may be admitted to the jackets to assist in maintaining a substantially uniform temperature. Temperature control during the reactivation of the catalyst may be facilitated by passing combustion gases at suitable temperatures through the jackets.

Since there may be a tendency to corrosion in polymer gathering lines due to condensation of small amounts of phosphoric acid extracted from the catalyst beds by condensed steam, suitable lines are preferably provided for the admission of sufficient alkali such as aqueous caustic soda to neutralize this acid and prevent corrosion of the lines. There should be a sufficient volume of alkaline wash in the polymer header to insure its thorough flushing and sufficient alkali to prevent the wash water from becoming acidic. In the case of normally alkaline waters that are frequently encountered in refinery practice the addition of caustic soda or other alkali may not be necessary. The condensed aqueous layer including the water originally introduced to maintain a 2–5% concentration of steam in the vapors undergoing treatment, any additional wash water and the aqueous alkalies introduced are withdrawn principally as a lower layer in a succeeding water separator, which receives the total products from the polymerizing step including any unconverted olefins, residual saturated hydrocarbon gases and liquid polymers which are present at this point.

The total hydrocarbon products from the water separator (which may be separated hot), are further cooled during passage through a condenser and passed to an absorbing column in which a portion of the subsequently debutanized and stabilized polymers are used as absorbing liquid, thus insuring the complete recovery of butanes and unconverted butenes which may be recycled to further polymerization treatment. Any gases remaining unabsorbed at this point are customarily utilized as fuel in other parts of the plant or the refinery which provides the gas mixtures for polymerizing treatment.

The total liquid products from the bottom of the absorber are successively depropanized and debutanized in subsequent fractionating equipment. The overhead from the depropanizing column is preferably utilized as a means of controlling olefin concentration at the entrance to the first stage of polymerization treatment by returning regulated portions thereof depending upon the variations in the amount and proportions of the various olefins in the charge. The overhead $C_4$ fraction comprising principally butane is recovered and used for whatever purpose it may be most suited such as, for example, regulating the vapor pressure of the polymer product to a desired point. The bottoms from the debutanizer are preferably used as the absorption medium to retain all polymerizable olefins which escaped polymerization, the absorption being made in the column before mentioned. The major proportion of the debutanized material is preferably sweetened by any of the known processes useful in effecting this treatment and then further fractionated to produce gasoline boiling range material.

The present process includes the feature of reactivating the spent polymerizing catalyst by the use of combustion gases of regulated oxygen content followed by a steaming to restore the catalytic acid constituent to a degree of hydration corresponding to maximum catalytic effectiveness. Combustion gases may be generated under a superatmospheric pressure sufficient to insure flow through the catalyst beds and dehumidified prior to their passage over the catalyst to insure a higher ultimate catalytic potency in the reactivated material. Either liquid or gaseous hydrocarbon fuel is admitted to a pressure combustion chamber, the air necessary for combustion being admitted to a pipe surrounding a burner line. In order to provide a combustion gas mixture with a low oxygen content for initially contacting the spent carbonized polymerizing catalyst so that undue temperature rise is avoided, the combustion is preferably conducted with a minimum of excess air and since this tends to produce a relatively high temperature in the combustion gases, provision is made for cooling the combustion gases by the injection of water or steam to prevent the development of excessive temperatures which would damage the refractory linings of the combustion chamber.

Combustion gases are cooled and dehumidified to a definite point corresponding usually to less than 3% by volume of steam and is heated to a temperature which will insure the initiation of combustion of the carbonaceous material on the spent polymerizing catalyst without causing the development of a temperature at which the catalyst is irreparably damaged either due to changes in physical structure or in chemical composition. It has been determined by experiment that it is best that the temperature of the catalyst during reactivation should not exceed 1000° F. and preferably 950° F. and that during the succeeding steaming the temperature be maintained throughout the catalyst bed with considerable accuracy at a point corresponding to 510° F. under atmospheric pressure. If a large amount of steam is passed downwardly through the granular catalyst in an effort to maintain this constant temperature, a differential pressure is produced, the pressure at the top of the catalyst bed is higher than at the bottom and the temperature is not high enough. In case minimum amounts of steam are used, there is a tendency to condensation on the inside of the walls of the chamber due to abstraction of heat by radiation so that it is practically essential to maintain a flow of separately generated combustion gases in the jackets surrounding the catalyst chambers during the passage of the steam.

The reactivating gas mixture may be distributed to any one of a series of the polymerizing catalyst chambers through a header which parallels that used for the admission of the gases to be processed. To control the rate of combustion of carbonaceous deposits on the granular catalyst particles, combustion gases containing usually less than 1% by weight of oxygen are first passed downwardly through a separate header which permits the introduction of steam at any desired point.

The attached drawing shows in general outline by the use of conventional figures in general side elevation, the arrangement of suitably interconnected units in which the basic operation of the process may be carried out. As will be seen from the following description, some of the features, such as, for example, the preliminary treatment of the charging stock, removal of sulfur and the sweetening of the final product have been omitted in the interests of simplicity, since both of these treatments may be effected by a number of more or less conventional methods which in themselves constitute no part of the present invention.

Referring to the drawing: Charging stocks, which may consist of the so-called stabilizer refluxes containing principally 3 and 4 carbon atom olefin and paraffin hydrocarbons, are introduced through a line 1 containing a valve 2 under the approximate pressures already mentioned. A requisite amount of steam necessary to prevent dehydration of the solid phosphoric acid is introduced from line 3 and valve 4, and the mixture passes through heating element 5 disposed to receive heat from a furnace 6 wherein it is brought up to the requisite temperature for effecting polymerization, which is done in the succeeding polymerizing column. The heated mixture passes through line 7 containing valve 8 to a polymerizer 9 which contains a bed of solid granular catalytic material, of the character previously described, in space 10. The treated and partially polymerized products, consisting of unreacted paraffins, any olefins which have escaped polymerization, vapors of the polymers formed and the added steam, pass through line 11 containing valve 12 to a water separator 13, which is provided with a water drain line 14' containing a valve 15'. This separator is preferably operated "hot" to condense and separate as much water as possible before products are passed to recovery of the unconverted olefins and stabilization. Cooling means can therefore be used along the line 11, although these are not indicated in the drawing.

Residual material, after hot water separation, passes through line 14 containing valve 15 through a cooler 16 which functions to reduce the temperature of the products to a point corresponding to the best absorption of residual 3 and 4 carbon atom olefins, the total products passing from the cooler through line 17 containing valve 18 to absorber 19 which may be of any conventional type consisting either of a packed column or a column containing bubble caps. Line 20 containing valve 21 permits the discharge of gases, while line 22 containing valve 23 conveys absorbed materials and absorbing liquid to a depropanizer feed drum 24. It is a feature of the present invention that stabilized polymers are used as the absorbing medium for recovering and concentrating olefins which have escaped polymerization. Owing to the olefinic character of the polymers, they exert a more or less selective solvent action upon the olefins in the residual gases coming from the polymerizer.

The depropanizer feed drum is provided with a gas vent line 27 containing valve 28 and a lower liquid draw-off line 25 containing a valve 26 for the removal of any water condensed in the absorber.

The polymers in drum 24 are now successively depropanized and debutanized to effect their stabilization to a given vapor pressure, the evolved propane-propene fraction being recycled in part to further contact with the polymerizing catalyst to recover any contained olefin values as polymers and to act as a diluent to control the percentage of higher olefins in the inlet material. Thus polymers in drum 24 pass through line 29 containing valve 30 to a pump 31 which discharges through line 32 containing valve 33 into a depropanizer 34 which may be of any conventional design and is preferably of bubble tray variety. The recycle propane-propene fractions pass in part through line 35 containing valve 36 to a pump or compressor 37 which discharges through line 38 containing valve 39 back to charging line 1, provision being made for withdrawing any excess of this three-carbon atom fraction through branch line 37' containing valve 38'. Depropanizer 34 is provided with a conventional reboiler coil 40 for supplying bottom heat and assisting the fractionation of the inlet material.

The depropanized polymers from depropanizer 34 pass through line 41 containing valve 42 to a pump 43 which discharges through line 44 containing valve 45 into a debutanizer 46 which may be any type of fractionator suitable for removing a sufficient amount of butanes and any unconverted butenes to reduce the polymers to a desired vapor pressure, the C₄ hydrocarbons being withdrawn through a vapor line 47 containing a valve 48. Debutanizer 46 has a conventional reboiler coil 49 for assisting in heating and fractionation.

In accordance with the present invention, a portion of the successively depropanized and debutanized polymers are passed back to the top of absorber 19 to effect a more or less selective absorption of the olefins therein contained. Thus the bottoms from debutanizer 46 pass through line 50 containing valve 51 to a pump 52 which discharges through a line 53 containing valves 54 and 55, the latter valve permitting the withdrawal of stabilized polymers. Branch line 56 containing valve 57 permits the return of portions of the stabilized polymers back to the top of absorber 19.

The following example embodies the operating conditions, yields and quality of product obtained from a plant designed and operating in conformity with the present invention although it is not intended to limit the scope of the invention in exact correspondence with the data presented.

A plant embodying the essential features of the process described above was charged with a mixture of cracked gases which has a higher olefin content including propene and the butenes of 17.4%. This gas was a composite of a primary cracked gas from the receiver of a cracking plant, a gas mixture from the stabilizer operating upon the gasoline produced in the cracking operation and a butane-butene fraction, these comprising respectively 47.1, 45.3, and 7.6% by volume of the total gas mixture in the order given. The primary gas from the cracking plant receiver was subjected to a caustic wash to remove hydrogen sulfide.

The combined gas mixture was preheated to a temperature of approximately 380° F. before contacting with the polymerizing catalyst under a pressure of approximately 250 lbs. per square inch, and the gases were passed through the last three of a series of four catalyst towers. At the exit of the second tower the temperature had risen to approximately 450° F. and the gas mixture entered the top of the third tower at a temperature of approximately 440° F. due to radiation losses in the connecting lines. In the third tower the temperature rose to 490° F. and again dropped to 480 before the gases reached the top of the fourth tower. In this tower the temperature rose to 500° F. After some time the first tower was placed in operation and the fourth tower was reactivated. Thereafter the cycle was continued as previously mentioned. All products were passed to an absorber as shown in the drawing after cooling to a temperature of 100° F. The presure at this point had fallen to 225 lbs. per square inch on account of the pressure drop through the catalyst towers. The gas released from the top of the absorber contained 4.2% olefins, principally ethylene.

The bottoms from the absorber were taken by a pump and fed to a depropanizer operating at a pressure of approximately 300 lbs. per square inch and a top temperature of 128° F. The gas mixture produced at this point had an olefin content of approximately 10% by volume and an amount of this gas equal to 16.5% by volume of the original gas mixture charged to the plant was recirculated to the polymerizing treatment.

In the succeeding debutanizer which was operated at a top temperature of approximately 250° F. and at a slightly lower pressure than the stabilizer, a butane fraction was produced for storage and later disposition which consisted of approximately 75% of butanes and 25% butenes. This corresponded to a production of 2.7 gallons per 1000 cu. ft. of gas mixture charged.

The debutanized polymer product was then subjected to a sweetening treatment and ultimately yielded 2.2 gallons of gasoline boiling range hydrocarbons (having an octane number of 85) per 1000 cu. ft. of gas mixture charged. The average percentage of olefins in the gases ultimately withdrawn from the plant was 7.5.

In the preceding operation an amount of water was added to the gas mixture entering the polymerizers equal to approximately 1% by volume of the vapors. As the catalyst towers became spent, they were withdrawn from service and the catalyst reactivated by passing flue gases of regulated and gradually increasing oxygen content therethrough until no sensible heat was developed when air alone was used. At no time was the temperature of 1000° F. exceeded in the catalyst beds. After the substantially complete removal of oxidizable deposits, the catalyst beds were further treated with superheated steam at temperatures of 500-520° F. and substantially atmospheric pressure as a final step in the reactivation process.

The nature of the present invention and its practical aspects are evident from the preceding specification and illustrative data although neither section is intended to be unduly limiting.

We claim as our invention:

1. A process which comprises subjecting normally gaseous hydrocarbons to polymerization, absorbing all of the products of said polymerization treatment with the exception of gases boiling below propane in a polymer liquid comprising materials boiling within the range of gasoline, stabilizing the resultant enriched polymer liquid to separate from its normally liquid components a fraction consisting essentially of three-carbon atom gases and a fraction consisting essentially of four-carbon atom gases, returning regulated quantities of the first mentioned fraction to said polymerization treatment and supplying a portion of the stabilized polymer liquid to the absorption step as absorber oil therein.

2. A process for the production of liquids boiling within the range of gasoline and of high antiknock value from mixtures of normally gaseous products containing at least a substantial quantity of olefins having more than two-carbon atoms to the molecule, which comprises heating the normally gaseous mixtures to a temperature of the order of 300 to 550° F., contacting the heated gases at a superatmospheric pressure of the order of 100 to 300 pounds per square inch with a solid catalyst comprising a phosphoric acid and thereby effecting substantial polymerization of said olefins, absorbing substantially all of the products of said catalytic polymerization step, with the exception of gases boiling below propane in a polymer liquid recovered from within the system, subjecting the resulting enriched polymer liquid to stabilization to separate from its normally liquid components a normally gaseous fraction consisting essentially of three-carbon atom hydrocarbons and a normally gaseous fraction consisting essentially of four-carbon atom hydrocarbons, returning regulated quantities of the first mentioned normally gaseous fraction to the heating step for further treatment and subsequent catalytic polymerization, in the manner previously described, and returning regulated quantities of said normally liquid components of the products resulting from said polymerization treatment, following their separation from said normally gaseous fractions, to the absorption step as absorber oil therein.

3. A process for the production of gasoline boiling range liquids of high antiknock value from gas mixtures comprising substantial quantities of olefins of more than two carbon atoms to the molecule, which comprises subjecting said gases to polymerization, subjecting the total products from the polymerizing step to absorption to recover substantially all propene, butenes, propane, butenes and higher-boiling components thereof, while releasing lighter gases, fractionating the absorbed products to produce an overhead fraction containing substantially no butanes, a butane fraction and bottoms, and supplying a portion of the bottoms from the fractionating step to the absorption step as absorber oil therein.

4. A process which comprises subjecting olefinic gas to polymerization, absorbing resultant products of more than 2 carbon atoms to the molecule in a polymer liquid, stabilizing the thus enriched polymer liquid to separate therefrom a $C_3$ fraction and a $C_4$ fraction, recovering the latter and returning at least a portion of the $C_3$ fraction to the polymerizing step, supplying to the absorption step a sufficient quantity of the stabilized polymer liquid to absorb said products of more than 2 carbon atoms to the molecule, and recovering the remaining portion of the stabilized polymer liquid.

5. A process which comprises subjecting olefinic gas to polymerization, scrubbing substantially all of the resultant products with an olefinic polymer liquid and absorbing products of more than 2 carbon atoms to the molecule in said liquid, stabilizing the thus enriched polymer liquid to separate $C_3$ and $C_4$ hydrocarbons therefrom, supplying to the absorption step a sufficient quantity of the stabilized olefinic polymer liquid to absorb said products of more than 2 carbon atoms to the molecule, and recovering the remaining portion of the stabilized polymer liquid.

6. A process which comprises subjecting olefinic gas to polymerization, scrubbing resultant products, including polymers boiling in the gasoline range, with an olefinic polymer liquid and absorbing products of more than 2 carbon atoms to the molecule in said liquid, stabilizing the thus enriched polymer liquid to separate $C_3$ and $C_4$ hydrocarbons therefrom, supplying to the absorption step a sufficient quantity of the stabilized olefinic polymer liquid to absorb said products of more than 2 carbon atoms to the molecule, and recovering the remaining portion of the stabilized polymer liquid.

7. The process as defined in claim 5 further characterized in that said stabilized polymer liquid, supplied to the absorption step, comprises fractions boiling in the gasoline range.

8. The process as defined in claim 6 further characterized in that said stabilized polymer liquid, supplied to the absorption step, comprises fractions boiling in the gasoline range.

ROBERT PYZEL.
ELMER R. KANHOFER.